United States Patent Office 3,445,420
Patented May 20, 1969

3,445,420
ACETYLENIC INHIBITED PLATINUM CATALYZED ORGANOPOLYSILOXANE COMPOSITION
Gust J. Kookootsedes and Edwin P. Plueddemann, Midland, Mich., assignors to Dow Corning Corporation, Midland, Mich., a corporation of Michigan
No Drawing. Filed June 23, 1966, Ser. No. 559,729
Int. Cl. C08g 47/02
U.S. Cl. 260—37                    12 Claims

ABSTRACT OF THE DISCLOSURE

A curable composition which can be stored in the presence of the catalyst but cures by heating or exposure to the atmosphere is a mixture of an olefin containing organosilicon polymer, an organosilicon compound containing silicon-bonded hydrogen atoms, a platinum catalyst and an acetylenic compound. The composition is usable as elastomers, potting compounds, sealants, dielectric gels, resins, coatings and the like.

---

This application relates to new, one-component organopolysiloxane compositions which are curable in the presence of platinum group metals by means of the reaction of ≡SiH groups and terminally-unsaturated monovalent hydrocarbon radicals.

More particularly, this application relates to new inhibitors for the above curing reaction which permit the storage of the above curable organopolysiloxanes in the presence of a curing catalyst for considerable lengths of time without curing.

Silicone compositions which are curable by the reaction of ≡SiH and silicon-bonded, terminally unsaturated olefin radicals are well known and are disclosed in such patents as U.S. 2,823,218 and U.S. 3,249,581, but it has been hitherto unknown that organic materials which contain acetylenic unsaturation and which have a boiling point of at least 25° C. serve as excellent cure inhibitors for the above compositions.

This application relates to a curable composition comprising (1) an organosilicon polymer having an average of from one to three groups per silicon atom selected from the group consisting of monovalent hydrocarbon radicals, free of acetylenic unsaturation, monovalent halohydrocarbon radicals, free of aliphatic unsaturation, and cyanoalkyl radicals, there being at least one terminally unsaturated monovalent olefin radical per molecule of (1), the remaining valences of the silicon atoms of the said organosilicon polymer being satisfied by selection from the group consisting of divalent oxygen atoms, divalent hydrocarbon radicals, free of acetylenic unsaturation, divalent hydrocarbon ether radicals, free of acetylenic unsaturation, and divalent haloarylene radicals, said divalent radicals linking silicon atoms, (2) an organosilicon compound containing at least one silicon-bonded hydrogen atom per molecule, there being in addition an average of up to two groups per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by groups selected from the group consisting of divalent oxygen atoms, divalent hydrocarbon radicals, free of aliphatic unsaturation, divalent hydrocarbon ether radicals free of aliphatic unsaturation, and divalent haloarylene radicals, said divalent radicals linking silicon atoms, the sum of the average number of terminally unsaturated monovalent olefin radicals per molecule of (1) and the average number of silicon-bonded hydrogen atoms per molecule of (2) being greater than 3, (3) a platinum catalyst in an amount of at least 0.5 part per million of platinum based on the combined weights of (1) and (2), and (4) an organic compound having a boiling point of at least 25° C. and at least one —C≡C— group, said organic compound being free of nitrogen, carboxyl, phosphorus, mercapto groups, and carbonyl groups which are alpha to aliphatically unsaturated carbon atoms, there being at least 2 times the moles of —C≡C— present as the moles of platinum present.

The term "curable" as used herein means that the compositions of this invention have the capability of forming compositions of increased molecular weight.

It is preferred that ingredient (1) contain an average of at least two terminally unsaturated olefin radicals per molecule and that ingredient (2) contain an average of at least two silicon-bonded hydrogen atoms per molecule in order to permit the curing reaction to proceed to form very high molecular weight products which are useful gums, elastomers, etc.; but materials having a lower degree of cure can be used as flowable dielectric gels, sealants, and other materials where it is desirable to cause a less viscous material to cure to a material of higher viscosity.

When either or both of ingredients (1) or (2) contain more than two of their respective olefin and SiH radicals, a correspondingly tighter cure is obtained. The various techniques of adjusting the crosslink density of a given cured material are well known to the art, and do not need to be discussed in detail.

The compositions of this invention are slower to cure under comparable conditions than is an equivalent composition which contains no ingredient (4). They are more versatile than compositions containing inhibitors such as benzotriazole, disclosed in U.S. Patent No. 3,192,181, as the inhibitors of this application are generally volatilizable out of the curable composition when it is not in a sealed container. The result is that compositions within the scope of this invention can be designed to be room temperature or low temperature curing in the open while exhibiting a higher inhibition to cure as long as they are sealed from the air.

It is preferable for ingredient (4) to have a boiling point of no more than 250° C. at standard pressure. Ingredient (4) should have a boiling point of at least 25° C. in order to avoid excessively rapid volatilization and cure.

Ingredient (4) can be any organic compound as described, e.g.

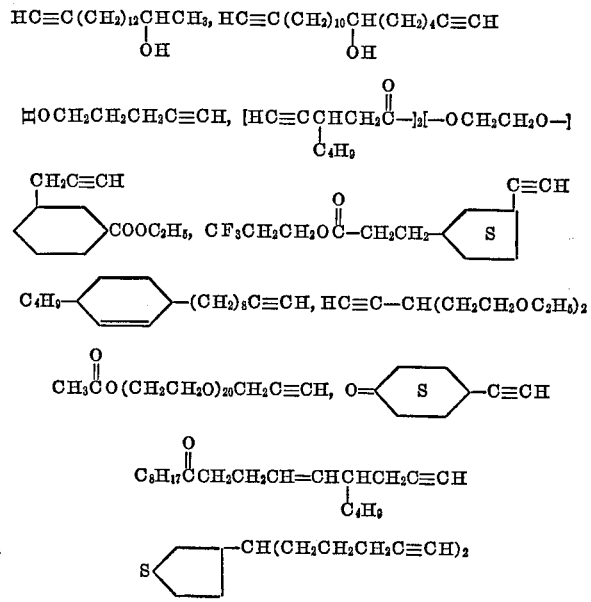

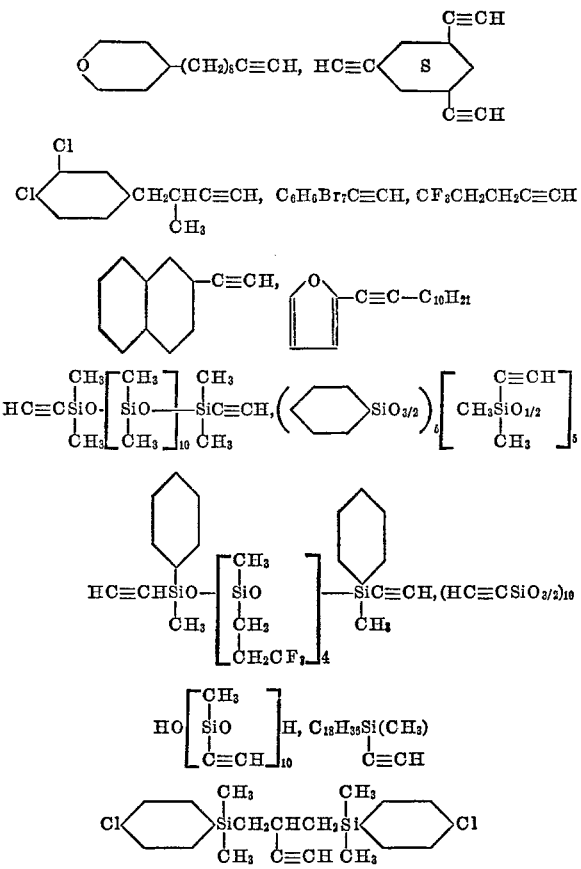

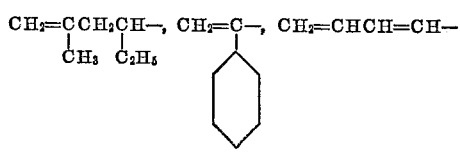

and the acetylenic materials shown in the examples.

Ingredient (4) is preferably a secondary or tertiary acetylenic alcohol, and is preferably present in at least 0.1 weight percent concentration.

Ingredient (3) can be any platinum catalyst, e.g. platinum deposited on charcoal or alumina, chloroplatinic acid, or the reaction product of chloroplatinic acid and olefins or organosilicon compounds containing olefin radicals.

Ingredients (1) and (2) are known materials and are disclosed in U.S. Patent 3,192,181, as well as in many other references.

Organosilicon compound (1) can be a resin, a fluid or a substantially non-flowing high polymer such as is conventionally used in silicone rubber manufacture. Any monovalent hydrocarbon radical, halohydrocarbon radical, or cyanoalkyl radical which can be used with organosilicon compounds as stated above is operable in component (1). Examples of monovalent hydrocarbon radicals that can be used include, for example, alkyl radicals such as methyl, ethyl, isopropyl, tert-butyl, octadecyl or myricyl; cycloalkyl radicals such as cyclopentyl or cyclohexyl; alkenyl radicals such as vinyl or cyclohexenyl; aralkyl radicals such as benzyl or 2-phenylethyl; alkaryl radicals such as tolyl or xylyl; and aryl radicals such as phenyl, naphthyl, xenyl or anthracyl.

Examples of monovalent halohydrocarbon radicals and cyanoalkyl radicals which can be used in (1) include chloromethyl, 3,3,3 - trifluoropropyl, 2,3 - dibromocyclopentyl, iodophenyl, dichloronaphthyl, 2-cyanoethyl, 2-cyanopropyl, and omega-cyanooctadecyl.

Examples of terminally-unsaturated monovalent olefin radicals are allyl, $CH_2=CH(CH_2)_8-$,

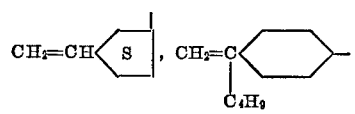

and any other monovalent hydrocarbon radical containing $CH_2=C=$. The vinyl radical is preferred.

The monovalent organic radicals in (1) can be the same or different. The terminally unsaturated olefin radicals can also be the same or different. Organosilicon compounds (1) and (2) can each be copolymers or mixtures of copolymers.

The remaining valences of the silicon atoms in organosilicon compound (1) are satisfied by divalent oxygen, divalent hydrocarbon radicals, divalent hydrocarbon ether radicals and divalent haloarylene radicals as described above. Any one or more of the said divalent linkages can be present in component (1).

Examples of divalent radicals that can be used in component (1) include, for example, hydrocarbon radicals such as $-CH_2-$, $-CH_2CH_2-$, $-(CH_2)_{18}-$,

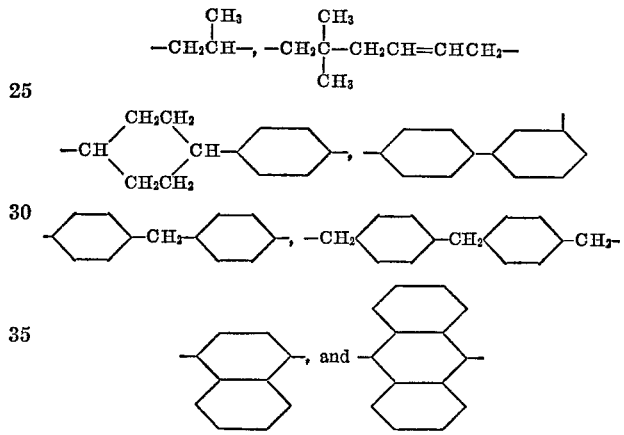

hydrocarbon ether radicals such as $-CH_2CH_2OCH_2CH_2-$, $-CH=CHCH_2OCH_2-$ $-CH_2CH_2CH_2OCH_2CH_2-$ and

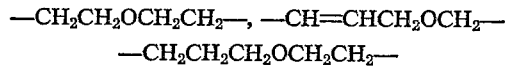

and haloarylene radicals such as

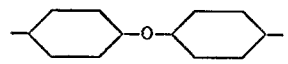

and

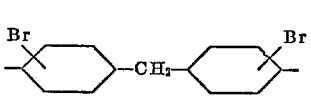

Various preparations of materials that can be ingredient (1) are well known in the art. The monovalent radicals can be attached for instance, by either the so-called "direct process" or Grignard reactions, or in some cases by a psuedo Friedel-Crafts reaction. Other reactions normally used to introduce organic radicals can also be used. Silicon-bonded oxygen is introduced by hydrolysis of a hydrolyzable group (such as halogen, alkoxy or acyloxy) on silicon, as is well known in the art. Divalent organic radicals can be introduced via a Wurtz-type synthesis or a Grignard reaction, etc.

Ingredient (2) can be any compound as above defined. Examples of the substituents which can be found in ingredient (2) are listed above, and methods for preparing it are well known.

It is preferred for ingredient (1) and ingredient (2) to be organopolysiloxanes. Ingredient (1) is most preferably an organopolysiloxane having an average of from 1.98 to 2.05 groups per silicon atom which are selected from the group consisting of vinyl, methyl, phenyl, and 3,3,3-trifluoropropyl, and having an average of from 2 to 5 vinyl groups per molecule, while ingredient (2) is most preferably an organopolysiloxane having an average of 3 to 75 silicon-bonded hydrogen atoms per molecule.

The various known methods can be used to mix the ingredients of this invention, e.g. by codispersing the ingredients in a solvent or other liquid dispersing agent such as an emulsion carrier, or by milling or mixing.

The compositions of this invention are frequently strengthened in their cured form by the addition of a filler, e.g. glass fibers, quartz, alumina or diatomaceous earth; silica soots, hydrogels or aerogels; silicas rendered hydrophobic by treatment with trimethylchlorosilane, hexamethyldisilazane, triphenyltrimethylcyclotrisiloxane, etc.; or other known fillers.

Other additives are also includable, e.g. compression set aids, organosilicon and organic plasticizers, and reactive extending agents for cheapening the material and reducing the viscosity, particularly those which can graft into the material on curing, for example, styrene.

The molar ratio of aliphatically unsaturated radicals in (1) to the silicon-bonded hydrogen atoms in (2) can be an important consideration, and the ratio of these two is preferably between 0.67 and 1.5. However, there are instances wherein a balance of these two quantities is unimportant. For example, if a component (1) has an average of six aliphatically unsaturated groups per molecule, the use of equal molar amounts of silicon-bonded hydrogen atoms may well give a cure which is too tight for the desired end use. In that case, less than an equal molar amount of SiH can accordingly be used to provide the desired degree of cure. However, when maximum stability is required, it is best to match the molar quantities of silicon-bonded hydrogen atoms in (2) with the aliphatically unsaturated radicals in (1).

The compositions of this invention are usable as stable elastomer stocks or potting compounds. Depending in part on the volatility of the specific ingredient (4) which is chosen for use, one can prepare room temperature or low temperature curing stocks which are relatively stable when enclosed in an air-tight container, or high temperature vulcanizing stocks which are relatively stable upon exposure to the air at room temperature.

Most of the compositions of this invention can be cured while sealed from the air by heating, if desired.

The compositions of this invention frequently show particularly strong inhibition to cure when dispersed in a volatile diluent, e.g. organic solvents such as xylene, toluene, heptane, methylisobutylketone, isopropanol, tetrahydrofuran, dibutylether, 1,1,1-trichloroethane, chlorobenzene, trichlorotrifluoroethane, and chloroform. Water can be used as the diluent under conditions where there is little hydrolysis of the SiH bonds present.

It is preferred for the diluent to constitute from 60 to 99 weight percent of the dispersion.

When the above dispersion is allowed to evaporate, the composition of this invention cures in the customary manner. These dispersions are therefore useful as coating compositions for metal, wood, glass, etc.

The compositions of this invention can be designed to cure to thermosetting resins, to strong elastomers, and to gels of varying types which are useful for potting and encapsulation. The nature of the product primarily depends on the crosslink density and distribution, and the preparation of the various products is within the skill of those who are familiar with the art.

The following examples are illustrative only and should not be construed as limiting the invention, which is properly delineated in the appended claims.

EXAMPLE 1

Several 10 gram samples were prepared of a commercial uncured silicone potting compound containing a vinyl-endblocked dimethylpolysiloxane of 2,000 cs. viscosity at 25° C., a trimethylsiloxane-endblocked methylhydrogenpolysiloxane containing about 35 SiH groups, a terpolymer of $(CH_3)_3SiO_{1/2}$,

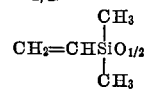

and $SiO_{4/2}$ units, and a catalytic amount (about 5 parts per million) of platinum in the form of a solution of chloroplatinic acid; in such proportions that there were approximately equal numbers of $\equiv SiH$ and $\equiv SiCH=CH_2$ units present.

The following inhibitors were added to the above samples. Films of the above samples were then allowed to stand at room temperature, and other films were heated at 100° C., while the remaining portions of the samples were sealed in vials and either allowed to stand at room temperature or heated at 100° C.

The results were as follows:

| Inhibitor | Amount (grams) | Film at room temp. Stand 1 day | Stand 3 days | Film at 100° C., time to cure (min.) | Sealed vial stand at room temperature | Heated in sealed vial at 100° C., gel time (min.) |
|---|---|---|---|---|---|---|
| (a) None | | Cured | Cured | 10 | Gel in 12 hrs | 15 |
| (b) $(CH_3)_2C-C\equiv CH$, OH | 0.02 | Sticky | do | 45 | No change in 3 days | 30 |
| (c) Same as (b) | 0.10 | do | do | 45 | do | >600 |
| (d) Butyne-2 | 0.02 | Cured | do | 15 | Gel in 16 hrs | 20 |
| (e) Butyne-2 | 0.10 | Sticky | do | 15 | Gel in 32 hrs | 30 |
| (f) $CH_2=C-C\equiv CH$, $CH_3$ | 0.02 | Tacky | do | 30 | No change in 3 days | 450 |
| (g) Same as (f) | 0.10 | do | do | 40 | do | >600 |
| (h) Phenylacetylene | 0.02 | do | do | 15 | Gel in 32 hrs | 15 |
| (i) Phenylacetylene | 0.10 | Sticky | do | 15 | No gel in 3 days | 15 |
| (j) The alcoholysis product of $(CH_3)_2C-CH\equiv CH$, OH and trimethoxysilane | 0.02 | Liquid | Sticky | 45 | No change in 3 days | 75 |
| (k) Same as (j) | 0.10 | do | Liquid | 40 | do | >600 |
| (l) $C_6H_5Si(OCH_2C\equiv CH)_3$ | 0.10 | do | do | 30 | No gel in 3 days | 100 |

EXAMPLE 2

To bottles containing 55 g. of the platinum-catalyzed, uncured potting compound of Example 1 there were added the following inhibitor compounds in such proportion as to provide 0.0031 mole of [—C≡C—] per sample.

A ⅛" film of each potting compound was then exposed to the air while the remainder of the sample was sealed in its bottle and allowed to stand at room temperature. The gel time in each case was as follows:

| Inhibitor | Gel time (days) | |
|---|---|---|
| | 1/8" film | Sealed bottle |
| (a) 2-ethynylisopropanol | 1 | 47 |
| (b) 2-ethynylbutane-2-ol | 1 | 66 |
| (c) 1-hexyne-3-ol | 1 | 14 |
| (d) $CH_3(CH_2)_3\overset{CH_2CH_3}{\underset{\mid}{C}}H-\overset{\mid}{\underset{OH}{C}}HC\equiv CH$ | 2 | 32 |
| (e) $\underset{CH_2CH_2}{\overset{CH_2CH_2}{CH_2\diagup\diagdown C\diagup\diagdown C\equiv CH}}\underset{OH}{}$ | 2 | 82 |
| (f) 2,5-dimethyl-3-hexyne-2,5-diol | 5 | ~105 |
| (g) 3,6-dimethyl-4-octyne-3,6-diol | 5 | 32 |
| (h) 2,4,7,9-tetramethyl-5-decyne-4,7-diol | 8 | 32 |
| (i) 3,5-dimethyl-1-hexyne-3-ol | 2 | ~105 |
| (j) $CH_2=\overset{CH_3}{\underset{\mid}{C}}-C\equiv CH$ | 1 | 82 |
| (k) $\langle \text{Ph} \rangle Si(O\overset{\mid}{\underset{CH_3}{C}}H\overset{\mid}{\underset{CH_3}{C}}\equiv CH)_2$ | 109 | (¹) |
| (l) Diphenylacetylene | 2 | 2 |

¹ Uncured after 178 days.

EXAMPLE 3

An elastomer stock was formulated from the following ingredients: 100 parts by weight of a vinyl-endblocked silicone gum consisting essentially of 3,3,3-trifluoropropylmethylsiloxane units, 20 parts of a high surface area silica which had been rendered hydrophobic by treatment with sym - tris-3,3,3-trifluoropropyltrimethylcyclotrisiloxane in the presence of ammonia, a trace of a solution of chloroplatinic acid in sufficient amount to provide a concentration of about 5 parts per million of platinum, 1.75 parts of $$(CF_3CH_2CH_2SiO_{3/2})_2-(H\underset{CH_3}{\overset{CH_3}{\underset{\mid}{\overset{\mid}{Si}}}}O_{1/2})_4$$

and 0.1 part of 2-ethynylisopropanol.

The above elastomer stock was milled, deaerated, and sealed in a container. It remained uncured on storage at room temperature for more than 7 days.

A portion of the elastomer stock was extruded onto a plate as a thin strip and exposed to the air at room temperature. A skin formed on the elastomer stock in about one hour.

A thin strip of the elastomer stock was heated at 150° C. It cured to a strong elastomer in less than one hour.

EXAMPLE 4

A mixture was made of 100 parts by weight of a dimethylvinylsiloxane - endblocked dimethylpolysiloxane gum containing 0.142 mol percent of methylvinylsiloxane units, 55 parts of powdered silica having a surface area of 200 m.²/gm., 8 parts of a hydroxylated dimethylpolysiloxane fluid, 5 parts of diphenylsilane diol, and 1 part of a methylvinylpolysiloxane fluid.

This mixture was heated for 3 hours at 177° C.

To 100 parts of the above mixture there was added 10 parts of trihydrated aluminum oxide, 1.5 parts of a fluid copolymer of 1.9 molar parts of $$(CH_3)_2SiO_{1/2}\atop\underset{H}{\mid}$$

units, 0.1 molar part of $(CH_3)_3SiO_{1/2}$ units, 4.9 molar parts of $(CH_3)_2SiO$ units, and 3.1 molar parts of $$\underset{H}{\overset{CH_3SiO}{\mid}}$$

units, 1 part of a reaction product of chloroplatinic acid and a vinylated organopolysiloxane (about 0.003 part by weight platinum), and 0.25 part of 2-ethynylisopropanol.

The above mixture was sealed from the air. It remained uncured for over a week. The uncured material was then dispersed in 9 times its weight of xylene, and found to remain uncured for several weeks at room temperature.

Upon heating a strip of the mixture in the air at 100° C., it formed a cured elastomer in about 1 hour which had a die B tear strength of 190 p.s.i., a tensile strength of 1250 p.s.i., and an elongation of about 590.

EXAMPLE 5

When the following ingredients are mixed in such proportions that the moles of ≡SiH and aliphatically unsaturated linkages are approximately equal, curable mixtures having a retarded curing time, particularly when sealed from the air, are formed:

A. (1) A methylphenyl-5-hexenylsiloxane-endblocked terpolymer of equal moles of diphenylsiloxane, dimethylsiloxane, and phenylmethylsiloxane, having a viscosity of 50,000 cs. at 25° C.;

(2) $\left(\langle\text{Ph}\rangle Si\left(O\underset{H}{\overset{CH_3}{\underset{\mid}{\overset{\mid}{Si}}}}\langle\text{Ph}\rangle\right)\right)_3$ (3) 0.1 weight percent, based on (1) and (2), of platinized carbon;

(4) 0.5 weight percent, based on (1) and (2), of $$CH_3O\overset{O}{\overset{\|}{C}}CH_2CH_2C\equiv CCH_2CH_2\overset{O}{\overset{\|}{C}}OCH_3$$

and (5) 20 weight percent, based on (1) and (2), of carbon black.

B. (1) A diallylmethyl-endblocked polymer containing 50 mol percent of ethylmethylsiloxane units, 5 mol percent of octadecylmethylsiloxane units, 20 mol percent of 2-phenyl-propylmethylsiloxane units, and 25 mol percent of $$O_{1/2}\underset{CH_3}{\overset{CH_3}{\underset{\mid}{\overset{\mid}{Si}}}}\langle\text{Ph}\rangle\underset{CH_3}{\overset{CH_3}{\underset{\mid}{\overset{\mid}{Si}}}}O_{1/2}$$

units, having a viscosity of 250,000 cs. at 25° C.;

(2) $H\underset{CH_3}{\overset{CH_3}{\underset{\mid}{\overset{\mid}{Si}}}}\langle\text{Ph}\rangle\underset{CH_3}{\overset{CH_3}{\underset{\mid}{\overset{\mid}{Si}}}}\langle\text{Ph}\rangle\underset{CH_3}{\overset{CH_3}{\underset{\mid}{\overset{\mid}{Si}}}}H$ (3) 0.01 weight percent, based on the weight of (1) and (2) of the reaction product of chloroplatinic acid and diphenyldimethyldivinyldisiloxane; and (4) 2 weight percent, based on the weight of (1) and (2), of $$\left(HC\equiv C\underset{CH_3}{\overset{CH_3}{\underset{\mid}{\overset{\mid}{Si}}}}\right)_2 O$$

C. (1) A mixture of (a) 40 parts by weight of a dimethylvinylsiloxy-endblocked β - cyanoethylmethylpolysiloxane fluid having a viscosity of 900 cs. at 25° C. and (b) 60 parts of a hydroxy endblocked copolymer containing 80 mol percent of chlorophenylmethylsiloxane units and 20 mol percent of tolylvinylsiloxane units having a viscosity of 10,000 cs. at 25° C.;

(2) $\left[H-\underset{CH_3}{\overset{S}{\underset{\mid}{\overset{\mid}{Si}}}}\langle\text{Ph}\rangle O\langle\text{Ph}\rangle\right.\left.-\underset{CH_3}{\overset{S}{\underset{\mid}{\overset{\mid}{Si}}}}H\right]_{\sim 30}$ (3) 0.0005 weight percent, based on the weight of (1) and (2), of chloroplatinic acid; and (4) 1 weight percent, based on the weight of (1) and (2), of $$CH_3O\overset{O}{\underset{\|}{C}}CH_2CH_2C\equiv CH_3$$

D. (1)

(1) $\left[ CH_2=CHSiO-\underset{\underset{Br}{\phantom{|}}}{\overset{\underset{\phantom{|}}{CH_3}}{Si}}\underset{\phantom{|}}{\phantom{|}}\phi\underset{\underset{Cl}{\phantom{|}}}{Si}O-\underset{\underset{Br}{\phantom{|}}}{\overset{\underset{\phantom{|}}{CH_3}}{Si}}CH=CH_2 \right]_{20}$ (where the Si atoms also bear phenyl groups)

(2) $H_2\underset{\phi}{\overset{CH_3}{Si}}O-\left[\underset{\phi}{\overset{C_4H_9}{Si}}CH_2CH_2\underset{\phi}{\overset{C_4H_9}{Si}}O\right]-\underset{\phi}{\overset{CH_3}{Si}}H_2$ (with CF$_3$ substituents)

(3) the catalyst of (C) above; and
(4) 0.5 weight percent, based on the weight of (1) and (2) of $CH_3(CH_2)_{10}C\equiv C$—$CH_3$.

E. (1) A copolymer of 99 mol percent of $$\left[-\underset{CH_3}{\overset{CH_3}{\underset{|}{Si}}}CH_2-\right]$$

units and 1 mol percent of $$\left[-\underset{\phi,\ C=CH_2}{\overset{CH_3}{\underset{|}{Si}}CH_2-(CH_2)_4}\right]$$

units, having a viscosity of 20,000 cs. at 25° C.;

(2) $H\underset{CH_3}{\overset{CH_3}{\underset{|}{Si}}CH_2}\left[\underset{CH_3}{\overset{CH_3}{\underset{|}{Si}}CH_2}\right]_{50}-\underset{CH_3}{\overset{CH_3}{\underset{|}{Si}}}H$ (3) The catalyst of (C) above; and 2 weight percent, based on the weight of (1) and (2), of (4) $[HC\equiv C(CH_2)_3(OCH_2CH-)_3]_2[-OCH_2CH_2O-]$
$\phantom{[HC\equiv C(CH_2)_3(OC}|$
$\phantom{[HC\equiv C(CH_2)_3(OCH)}CH_3$ That which is claimed is:

1. A curable composition comprising
    (1) an organosilicon polymer having an average of from one to three groups per silicon atom selected from the group consisting of monovalent hydrocarbon radicals, free of acetylenic unsaturation, monovalent halohydrocarbon radicals, free of aliphatic unsaturation, and cyanoalkyl radicals, there being at least one terminally unsaturated monovalent olefin radical per molecule of (1), the remaining valences of the silicon atoms of the said organosilicon polymer being satisfied by selection from the group consisting of divalent oxygen atoms, divalent hydrocarbon radicals, free of acetylenic unsaturation, divalent hydrocarbon ether radicals, free of acetylenic unsautration, and divalent haloarylene radicals, said divalent radicals linking silicon atoms,
    (2) an organosilicon compound containing at least one silicon-bonded hydrogen atom per molecule, there being in addition an average of up to two groups per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by groups selected from the group consisting of divalent oxygen atoms, divalent hydrocarbon radicals, free of aliphatic unsaturation, divalent hydrocarbon ether radicals free of aliphatic unsaturation, and divalent haloarylene radicals, said divalent radicals linking silicon atoms, the sum of the average number of terminally unsaturated monovalent olefin radicals per molecule of (1) and the average number of silicon-bonded hydrogen atoms per molecule of (2) being greater than 3,
    (3) a platinum catalyst in an amount of at least 0.5 part per million of platinum based on the combined weights of (1) and (2), and
    (4) an organic compound having a boiling point of at least 25° C. and at least one —C≡C— group, said organic compound being free of nitrogen, carboxyl, phosphorus, mercapto groups, and carbonyl groups which are alpha to aliphatically unsaturated carbon atoms, there being at least 2 times the moles of —C≡C— present as the moles of platinum present.

2. The composition of claim 1 where (4) is an acetylenically unsaturated secondary or tertiary alcohol.
3. The composition of claim 1 where (4) is 2-ethynylisopropanol.
4. The composition of claim 1 where (4) is 3.5-dimethyl-1-hexyne-3-ol.
5. The composition of claim 1 where (4) is isopropenylacetylene.
6. The composition of claim 1 where (4) is 2-ethynylbutane-2-ol.
7. The composition of claim 1 where (1) is an organopolysiloxane having an average of from 1.98 to 2.05 groups per silicon atom which are selected from the group consisting of vinyl, methyl, phenyl, and 3,3,3-trifluoropropyl, and having an average of from 2 to 5 vinyl groups per molecule.
8. The composition of claim 1 where (2) is an organopolysiloxane having an average of 3 to 75 silicon-bonded hydrogen atoms per molecule.
9. The composition of claim 1 where (3) contains chloroplatinic acid.
10. The composition of claim 1 which contains a silica filler.
11. The composition of claim 1 where ingredient (4) has a boiling point at standard pressure of no more than 250° C.
12. A dispersion of the composition of claim 1 in a volatile diluent.

References Cited

UNITED STATES PATENTS

| | | | |
|---|---|---|---|
| 2,970,150 | 1/1961 | Bailey | 260—348 |
| 3,249,581 | 5/1966 | Nelson | 260—37 |
| 3,198,766 | 8/1965 | Nitzsche | 260—46.5 |

MORRIS LIEBMAN, *Primary Examiner.*

J. L. JACOBS, *Assistant Examiner.*

U.S. Cl. X.R.

260—46.5